B. MAGOR.
UNDERFRAME FOR CARS.
APPLICATION FILED JULY 3, 1913.
Reissued Dec. 9, 1913. 13,655.
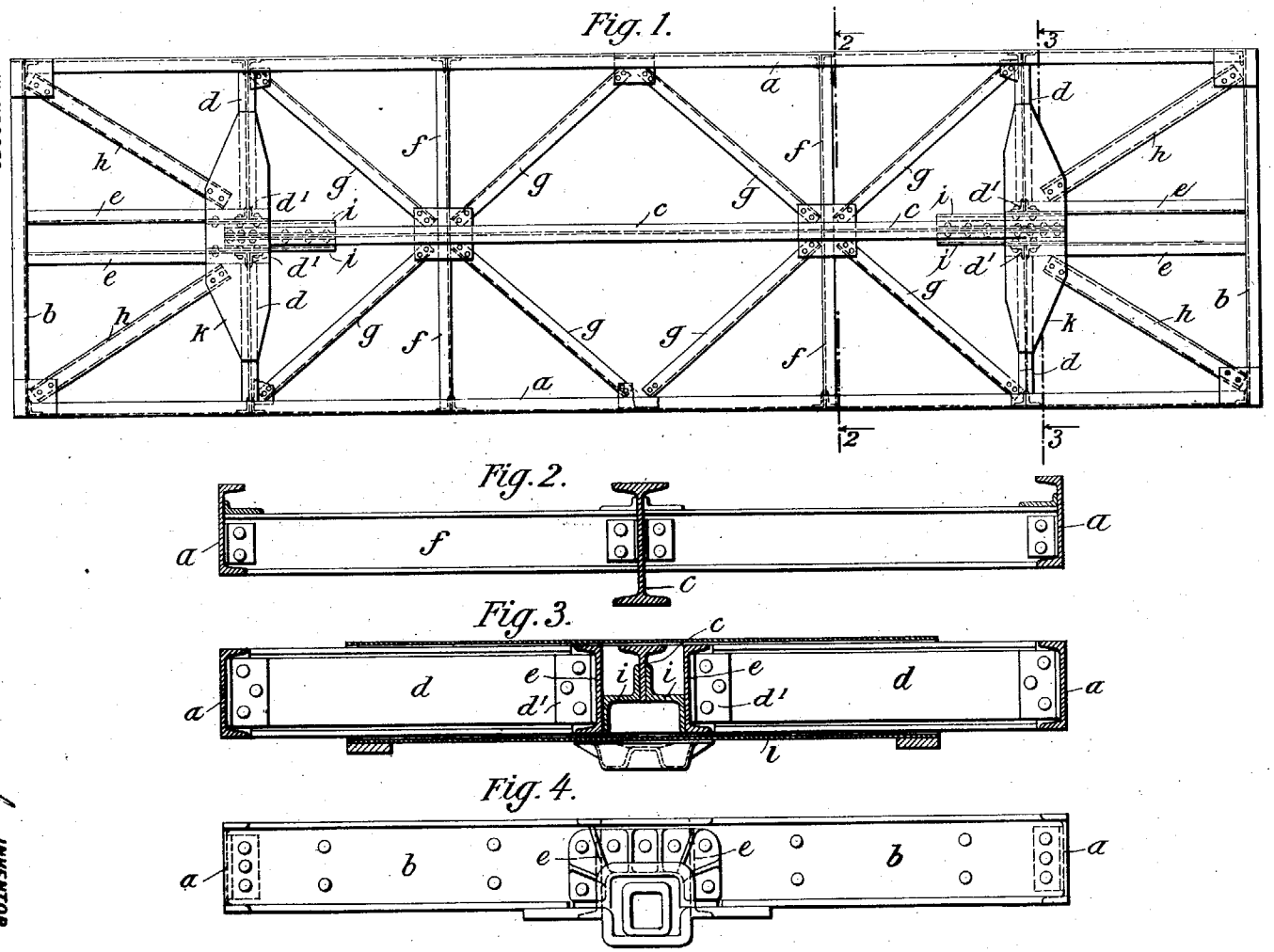
WITNESSES
Geo. Schwarz
L. Bottiger.
INVENTOR
Basil Magor
BY
Booth Farmer & Tarney
ATTORNEYS

UNITED STATES PATENT OFFICE.

BASIL MAGOR, OF HAMILTON, ONTARIO, CANADA.

UNDERFRAME FOR CARS.

13,655. Specification of Reissued Letters Patent. Reissued Dec. 9, 1913.

Original No. 1,016,165, dated January 30, 1912, Serial No. 627,210. Application for reissue filed July 3, 1913. Serial No. 777,337.

*To all whom it may concern:*

Be it known that I, BASIL MAGOR, a subject of the King of Great Britain, and a resident of the city of Hamilton, in the Province of Ontario and Dominion of Canada, have invented certain new and useful Improvements in Underframes for Cars, of which the following is a specification, reference being had to the accompanying drawing, forming a part hereof.

The object of the invention is to provide an underframe which shall be particularly adaptable for steel cars designed to carry sugar-cane.

Aside from the general design of the frame, the invention resides particularly in the construction of the body-bolster and its associated parts.

In the drawing: Figure 1 is a plan view of the improved frame, being broken away in some places for the sake of completer illustration, Figs. 2 and 3 are sectional views upon the planes indicated by the lines 2—2 and 3—3 in Fig. 1, and Fig. 4 is an end view.

The side-sills *a* and end-sills *b* of the frame may consist of channels as shown, and the center-sill *c*, which extends between the body-bolsters *d*, preferably consists of a relatively broad I-beam, the center-sill being continued to the end-sills by draft-sills *e* which, as shown, are channels of the same size as the side and end sills. Between the body-bolsters, the frame is preferably braced by means of transverse channels *f*, shown in Fig. 2 as being less in depth than the side and end-sills, and by diagonal angle braces *g*. The frame is also shown as being braced at the ends by diagonal channels *h* extending from the center of the body-bolsters respectively to the corners of the frame.

The body-bolsters *d*, formed in the case of the present embodiment of the invention of I-beams, are each divided near their mid-parts to permit the insertion of the draft-sills *e*, a pair of which are as usual employed upon each end of the frame. These draft-sills may be secured to the respective sections of the I-beam bolster by angles $d^1$; but to unite them to the center sill *c* a Z-iron *i* is employed upon each side of the I-beam center sill (Fig. 3) one flange of the Z-iron being riveted to the web of the center-sill and the other flange similarly secured to the web of the corresponding draft sill. In most cases it will be preferable to extend the Z-irons inwardly beyond the ends of the draft sills in order to provide an extra fastening surface whereby they may be the more securely riveted to the center-sill, as shown in Fig. 1. By means of such a connection between the center-sill and the draft-sills upon either side thereof, a very strong and durable body-bolster is provided and one which resists to a great degree the bending and warping strains to which the frame is subject in use. Moreover, the draft-sills are thus very firmly, as well as simply, united to the center-sill and body-bolster and virtually become a part of the latter. To further unify and strengthen the body-bolster the usual top and bottom cover-plates, *k* and *l* respectively, are applied above and below the same as shown.

I claim as my invention:

1. A steel underframe for cars having a center-sill, a pair of draft-sills one on each side of the center-sill, and a Z-iron between each draft-sill and the center-sill to secure the one to the other.

2. A steel underframe for cars having an I-beam center-sill, a pair of channel iron draft-sills one on each side of the center-sill, and a Z-iron between each draft-sill and the center-sill and riveted thereto.

3. A steel underframe for cars having a center-sill, a pair of channel iron draft-sills at each end of the center-sill, and a Z-iron between each draft-sill and the center-sill to secure the one to the other.

4. A steel underframe for cars having a center-sill consisting of an I-beam, a pair of draft-sills one on each side of the I-beam and extending beyond the I-beam at each end thereof, and a Z-iron between each draft-sill and the I-beam to secure the draft-sills to the I-beam.

5. A steel underframe for cars having an I-beam center-sill terminating at points intermediate the ends of the frame, a pair of draft-sills one on each side of the center-sill at each end of the center-sill and continuing the center-sill to the ends of the frame, a Z-iron riveted between each draft-sill and the center-sill, and transverse I-beams extending from the inner ends of the draft-sills to the sides of the frame.

6. A steel underframe for cars having an I-beam center-sill terminating at points intermediate the ends of the frame, a pair of draft-sills one on each side of the center-sill at each end of the center-sill and continuing the center-sill to the ends of the frame, a Z-iron riveted between each draft-sill and the center-sill, transverse I-beams extending from the inner ends of the draft-sills to the sides of the frame, and diagonal braces extending from the inner ends of the draft-sills to the corners of the frame.

7. The combination of a car body having a single center sill extending at each end beyond the central line of the body bolster, with a pair of draft sills at each end of the car body extending from the end of the car to the rear edge of the body bolster, the said center sill and draft sills being suitably bound together by filler blocks into a continuous girder from end to end of the car body.

This specification signed and witnessed this 30th day of June, 1913.

BASIL MAGOR.

Witnesses:
L. RODGER,
GEO. G. ZINK.

Copies of this patent may be obtained for five cents each, by addressing the "Commissioner of Patents, Washington, D. C."